(12) United States Patent  (10) Patent No.: US 7,600,290 B1
Peters  (45) Date of Patent: Oct. 13, 2009

(54) MULTI-BLOWER

(75) Inventor: Clifford Eli Peters, Clearwater, FL (US)

(73) Assignee: Twindstorm LLC, Clearwater, FL (US)

( * ) Notice: Subject to any disclaimer, the term of this patent is extended or adjusted under 35 U.S.C. 154(b) by 327 days.

(21) Appl. No.: 10/832,775

(22) Filed: Apr. 27, 2004

Related U.S. Application Data

(60) Provisional application No. 60/499,481, filed on Sep. 2, 2003.

(51) Int. Cl.
*A47L 5/14* (2006.01)
*B08B 5/00* (2006.01)

(52) U.S. Cl. .................. 15/327.5; 15/405; 15/410; 415/99; 415/101; 415/203

(58) Field of Classification Search ............. 15/316.1, 15/317, 318, 327.5, 405, 410; 415/99, 101, 415/203, 206; *A47L 5/14; B08B 5/00; E01H 1/08; F04D 17/12*
See application file for complete search history.

(56) References Cited

U.S. PATENT DOCUMENTS 4,493,341 A * 1/1985 Wieland ................. 137/597

| 4,644,606 | A | 2/1987 | Luerken et al. |
| 5,813,088 | A | 9/1998 | Wagner et al. |
| 6,076,231 | A | 6/2000 | Bucher |
| 6,109,865 | A * | 8/2000 | Ishikawa ............. 415/98 |
| 6,928,693 | B1 * | 8/2005 | Ericson ............. 15/405 |

* cited by examiner

*Primary Examiner*—David A Redding
(74) *Attorney, Agent, or Firm*—Baker & Hostetler LLP

(57) ABSTRACT

The backpack Multi-Blower provides for the first time an apparatus that is unique in that one person manipulates two separate air discharge tubes in either different or unified positions simultaneously at debris. This multi-blower generates air from separate chambers inside the housing having their own discharge air outlet, thereby creating more combined volume as well as the ability to diversify how the air is directed, they're by blowing with greater ease, control, efficiency and effectiveness. Man-hours reduced significantly in that one person using the multi-blower removes the need for a second man to accompany with separate single port blower. Time saved in that one person coordinates two blower tubes, verses the old way of two people trying to think together in a fluid flow of movement as to effectively moving the debris together. These few listed benefits provide a blower apparatus that has improved drastically its function and use, which will save time, money and man-hours.

12 Claims, 5 Drawing Sheets

MULTI-BLOWER

Provisional Patent application No. 60/499,481 filed Sep. 2, 2003.

BACKGROUND OF THE INVENTION

1. Field of Invention

The unique present invention multi-blower refers to and is not limited to lawn, landscape and construction implements in the use of blower systems, most particularly pertaining to the backpack blower.

2. Description of the Prior Art

Blowers have been very helpful in allowing a person to move large amounts of debris. The backpack blower has made the task easier, quicker and with greater force than the prior hand held blowers were able to produce. Current blowers have a single air housing discharge port of operation. Below are other findings related to the present invention.

U.S. Pat. No. 4,644,606, describes a blower with one air blower assembly with the capacity of clearing debris from sidewalks, driveways or other surfaces. U.S. Pat. No. 5,813,088, backpack blower with a single air discharge right hand blower assembly and a separate left hand off/on control switch assembly. U.S. Pat. No. 6,076,231, introduces a special nozzle that has been adapted to a blower to channel the airflow in different directions. Helpful as these prior devises are, all of the above items are single port discharge units. They are limited as to their scope of use and ability to keep up with the demands of greater productivity; and none permits the operator to direct airflow towards debris from at least two separate directions simultaneously.

SUMMARY OF THE INVENTION

The present backpack blowers are single impeller discharge systems and directed by a single hand. This leaves your other hand empty and able for other use. Years I carried an additional hand held blower for greater power and productivity. The Lord inspired me to stack the two together on my back. In view of the fore going limitations inherent in the known types of backpack blowers present in the prior art, this multi-blower provides a unique benefit expansion over the current concepts, designs, and functions, of the blower. The multi-blower offers a greater functional and productive blower by combining the chambers, thus incorporating a left hand and a right hand blower system together as a single unit. The invention is designed to accept and receive at least two fully functional blower systems instead of the limited single discharge port system.

The multi-blower moves a far greater amount of debris in much less time, thereby reducing the man-hours of operation. The multi-blower also allows the operator to have greater control of debris and larger range of coverage in any given direction. Instead of two people trying to coordinate separate blower's nozzles, now one person independently controls two blower nozzles, manipulated in either separate or same general directions. The purpose of the multi-blower is to follow later in detail, as to providing a new and improved backpack blower system and method of use, which has all the advantages of the prior art and none of their limits.

The multi-blower provides and functionally incorporates a complete second blower housing system with an impeller/fan blade plate therein and an air discharge aperture that accepts and retains the complete opposite left hand side discharge system. The Component parts, which make this multi-blower system possible comprises: a motor driven drive shaft; a blower housing with multiple chambers, left and right for air to flow in and thru; two impeller blades right and left; and a divider plate, each housing chamber having its own separate discharge port.

This multi-blower also provides a unique sequence of use, wherein the user starts the engine, places the blower on their back using the shoulder straps, places the right side handheld assembly in the right hand position and then places the left side handheld assembly in the left hand side position. The user can now blow much more debris from a sidewalk, driveway or a variety of other places using both the right and left hand side assemblies simultaneously, thereby completing the job with greater ease and efficiency. What used to take two people to accomplish now one person does in less time, with much greater coordination and skill.

This has outlined, rather broadly, the main features of the invention in order that the detailed description thereof that follows will bring a better understanding of the multi-blower. Additional features of this invention are described later in detail, which will better form the subject matter of the claims.

In this respect, before explaining at least one embodiment of this invention in detail, it is to be noted that the multi-blower is not limited in its application to the details of construction and the arrangement of the components set forth in the following description or illustrated in the drawings. The multi-blower is capable of other embodiments used as blower units, whether harnessed on the back or a pushcart and of being practiced and carried out in various other ways. It is to be understood that the phraseology and terminology employed herein are for the purpose of overview and description, which should not be regarded in any way as limited in design and field of application. Those skilled in the art will appreciate that the conception, upon which this disclosure is based, may readily be utilized as a basis for the designing of other structures, modes, models, methods, such as the push blowers used in related fields and other systems for carrying out the unique and varied purposes of the multi-blower invention. It is important, therefore, that the claims be regarded as including, such equivalent constructions insofar as they do not depart from the spirit and scope of this invention.

Further, the purpose of the foregoing abstract is to enable the U.S. Patent and Trademark Office, the general public and especially the scientists, engineers and practitioners in the art who are not familiar with patent or legal terms or phraseology, to quickly determine, from a cursory inspection the nature and essence of the technical disclosure of the present application. The abstract is neither intended to fully define the invention of the application, which is measured by the claims, nor is it intended to be limited as to the scope of this invention in any way.

This invention makes available a unique and improved blower that is more effective for the consumers use; equally durable and reliable in its construction; and provides in the apparatuses and methods of the prior art some of the advantages thereof, while simultaneously overcoming some of the limitations normally associated therewith.

These together with other objects of this invention, along with the various features of novelties, which characterize this invention, are pointed out with a particularity in the claims annexed to and forming a part of this disclosure. For a better understanding of the multi-blower, it's operating and installation advantages and the specific objects attained by its uses refer to the accompanying drawings and descriptive matter which show some of the illustrated and preferred embodiments of the multi-blower invention.

BRIEF DESCRIPTION OF THE DRAWINGS

The multi-blower will be easier to understand and objects other than are set forth, will become apparent when consideration is given to the following detailed description. Such description makes reference to the annexed drawings wherein.

DESCRIPTION OF THE PREFERRED EMBODIMENT

Figure 1:
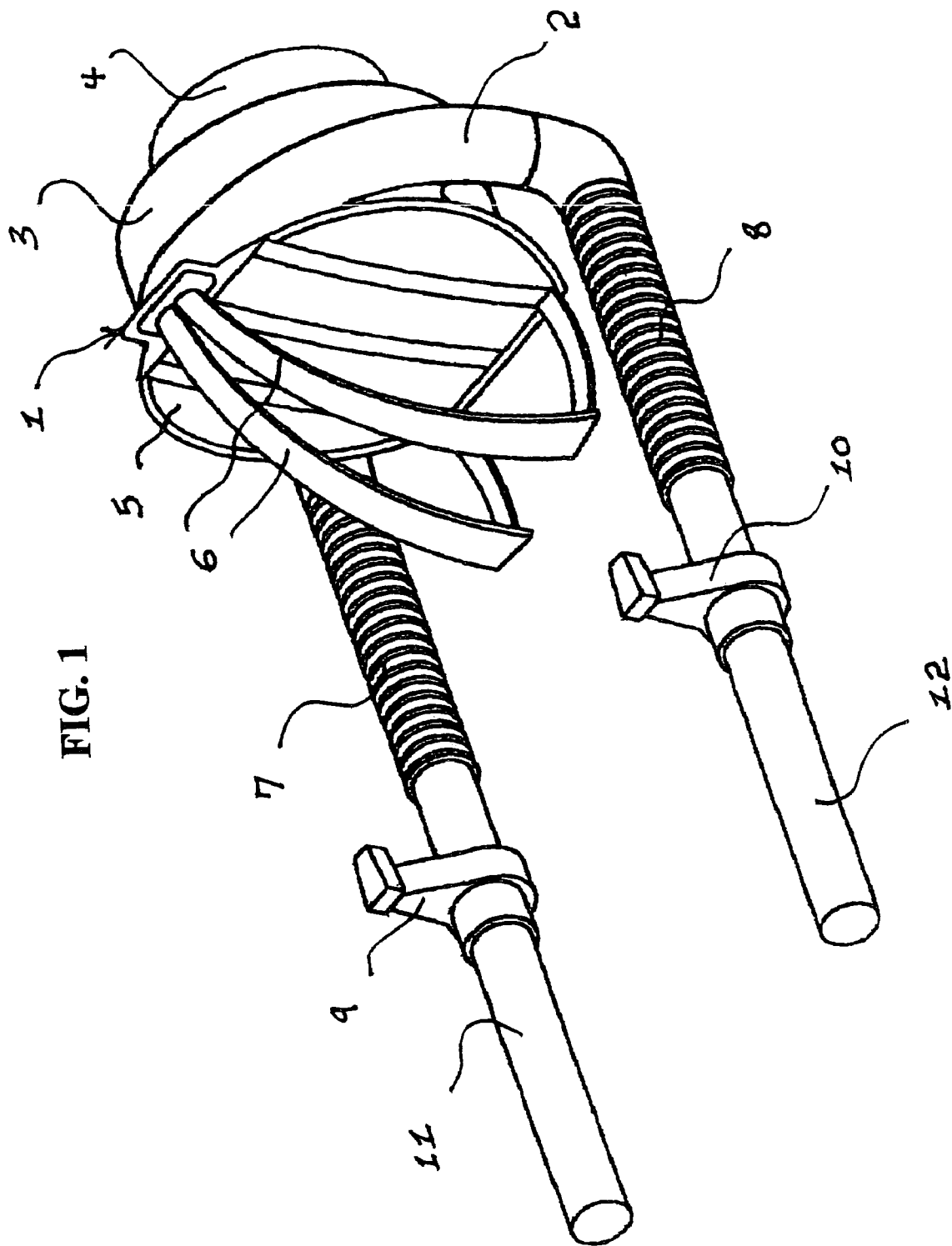
FIG. 1: is a simple perspective drawing of the unique multi-blower system showing both the left and right side blower assemblies.

With reference now to the drawings and in particular to FIG. 1 thereof, a unique and improved back pack multi-blower system embodying the principles and concepts of the present invention and generally designated by the reference numeral 1, will now be described.

FIG. 1 illustrates a left side perspective view of the preferred embodiment of the present invention. A backpack multi-blower system 1 is illustrated with a complete left side blower housing assembly 2 and right side blower housing assembly 3. Engine 4 is located at the back, while the front has a backpack support frame 5, including a carry handle with shoulder straps 6 for mounting on the operator's shoulders.

A typical blower has a power source attached to a complete single discharge system consisting of a single blower housing assembly 3 coupled to a discharge tube 7 where the air exits. Thus, holding a single control handle 9 allows air to release under the operator's control.

This multi-blower 1 has added a complete left side blower system with a left side blower housing assembly 2, which is coupled to the left side flexible discharge tube 8, which has a left side control handle 10, coupled to the rigid discharge tube 12 where air also exits.

Figure 2:
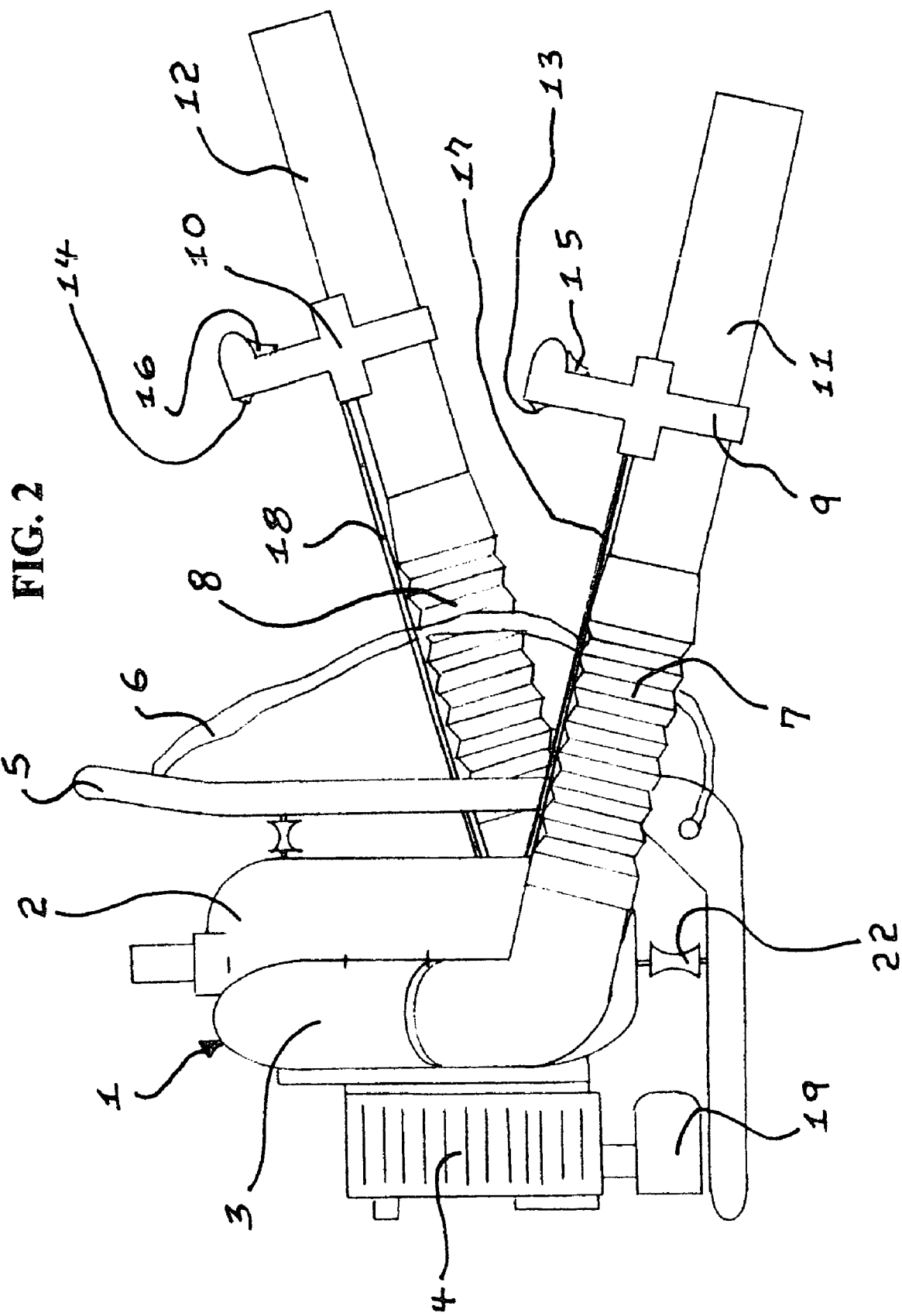
FIG. 2: a detailed right side view of the multi-blower system.

FIG. 2 is a right side view of backpack multi-blower system 1, with a complete left side blower housing assembly 2 and a complete right side blower housing assembly 3. Engine 4 and gas tank 19 are located at the back, while the front has a backpack support frame 5, including a carry handle thereon, with shoulder straps 6. Coupled to the right blower housing 3, is a right side flexible discharge tube 7, right control handle 9, right power cable 17 and right side on/off switch 13, with right throttle control 15, coupled to rigid discharge tube 11. Vibration mounts 22 are provided for smoother usability. The multi-blower system has incorporated the complete left blower system to the right. The left blower system includes a complete left side blower housing assembly 2, left side flexible discharge tube 8, left power cable 18, left control handle 10, left on/off switch 14, and left throttle control 16 coupled to left rigid tube 12 where air also exits.

Figure 3:
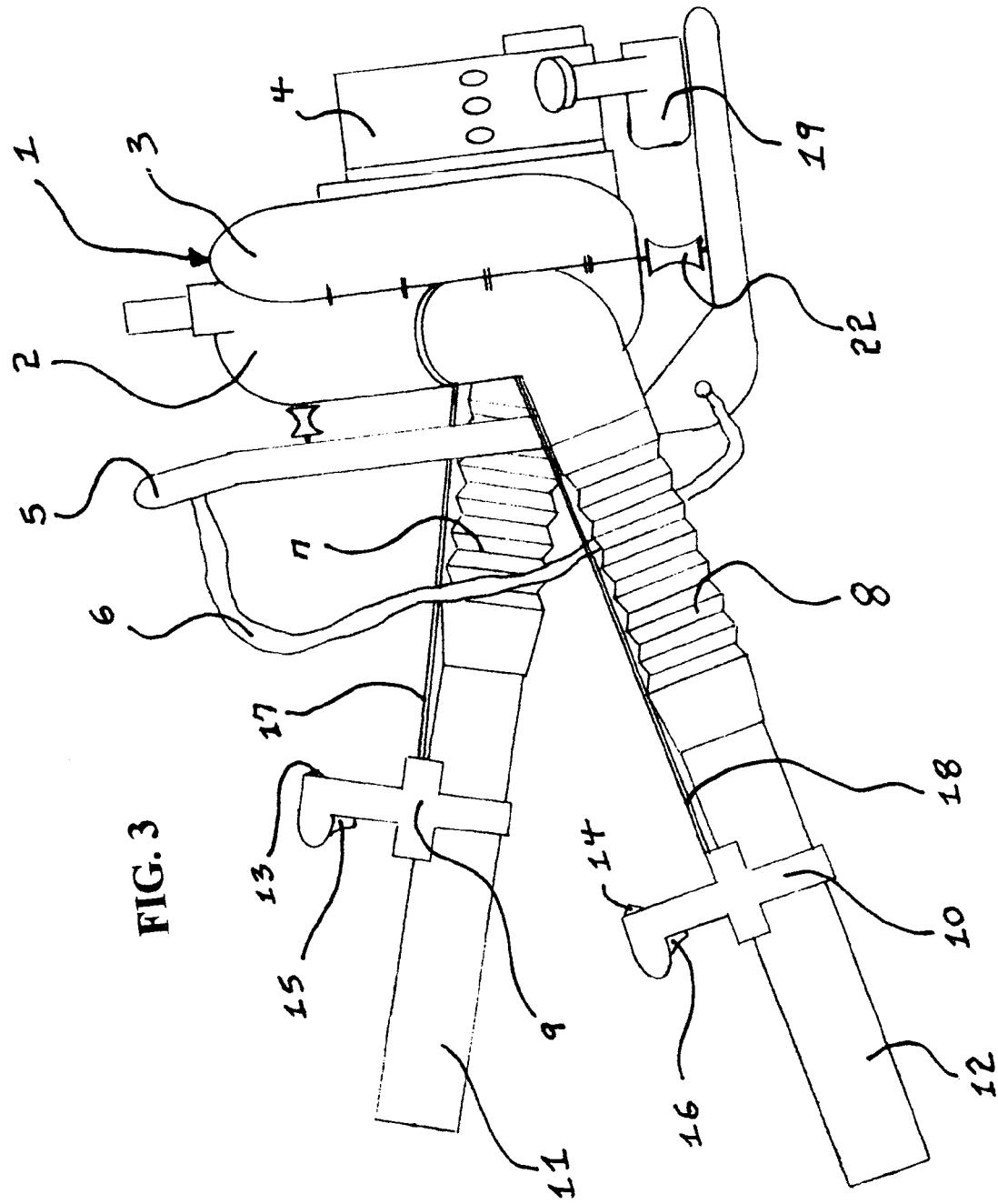
FIG. 3: a detailed left side view of the multi-blower system.

FIG. 3 is a left side view of backpack multi-blower system 1, with a complete left side blower housing assembly 2 and complete right side blower housing assembly 3. Engine 4 and gas tank 19 are located at the back. The front has a backpack support flame 5, with a carry handle and shoulder straps 6. The right assembly consists of right side blower housing assembly 3, a right side flexible discharge tube 7, right control handle 9, right power cable 17, right side on/off switch 13, right throttle control 15, and right rigid discharge tube 11 where air also exits.

The multi-blower system incorporates the complete left side discharge system which is, left side blower housing assembly 2, left side flexible discharge tube 8, left power cable 18, left control handle 10, left on/off switch 14, left throttle control 16, and left rigid discharge tube 12 where the air also can be released.

Figure 4:
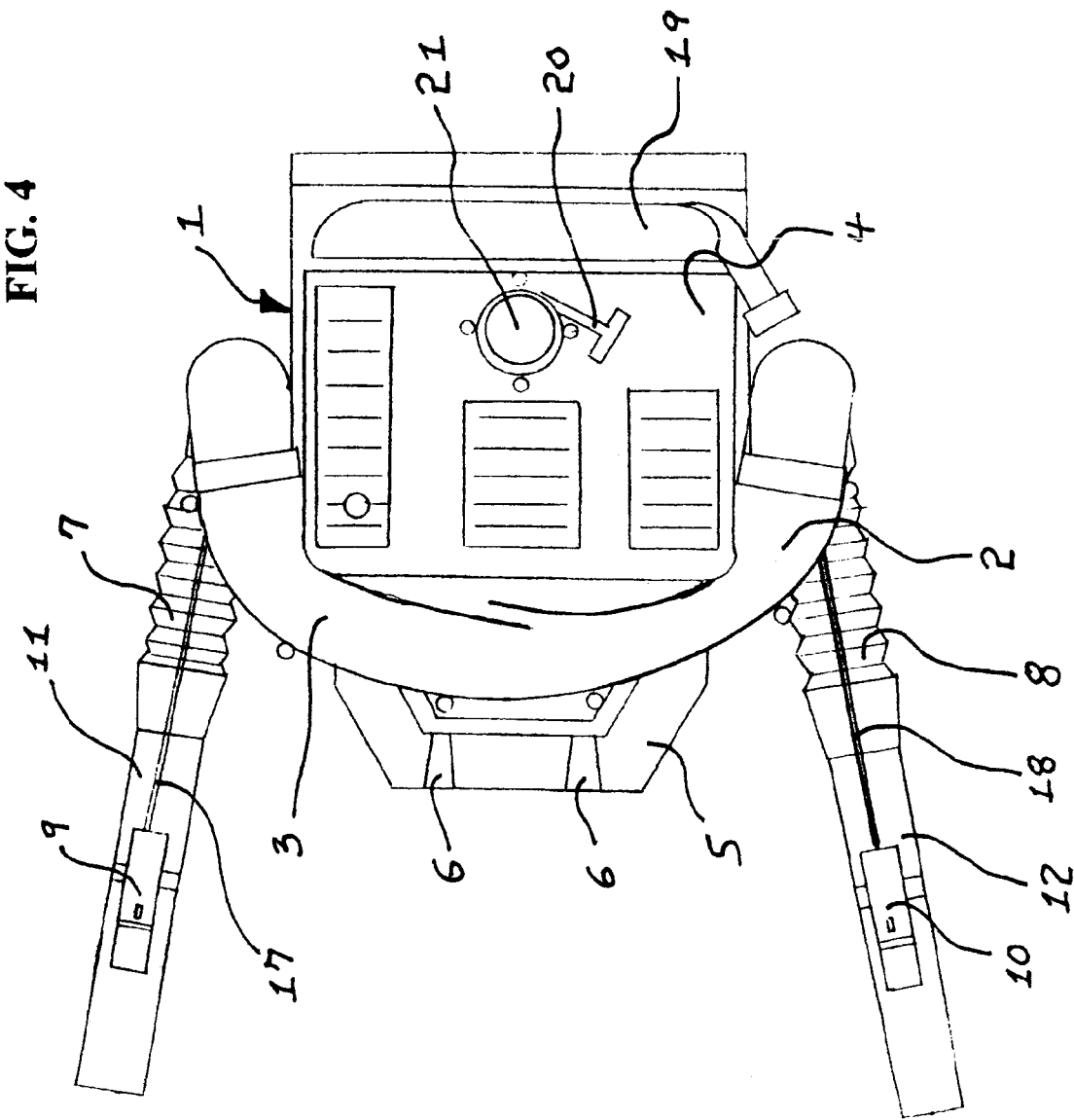
FIG. 4: a detailed top view of the multi-blower system.

FIG. 4 is the rear view of backpack multi-blower system 1 with, left side blower housing assembly 2, right side blower housing assembly 3, engine 4 and gas tank 19. Pull cord 20 and starter recoil 21 are coupled to the engine, while the front has a backpack support frame 5 with shoulder straps 6. The right side consists of blower housing assembly 3, the flexible discharge tube 7, right control handle 9, right power cable 17 and right rigid discharge tube 11. The multi-blower incorporates as one unit a left and right side blower discharge system, which includes the prior art single port of discharge with the left blower housing 2, left side flexible discharge tube 8, left power cable 18, left control handle 10, and left rigid discharge tube 12 where the air also can be discharged. This creates the unique framework of the multi-blower.

Figure 5:
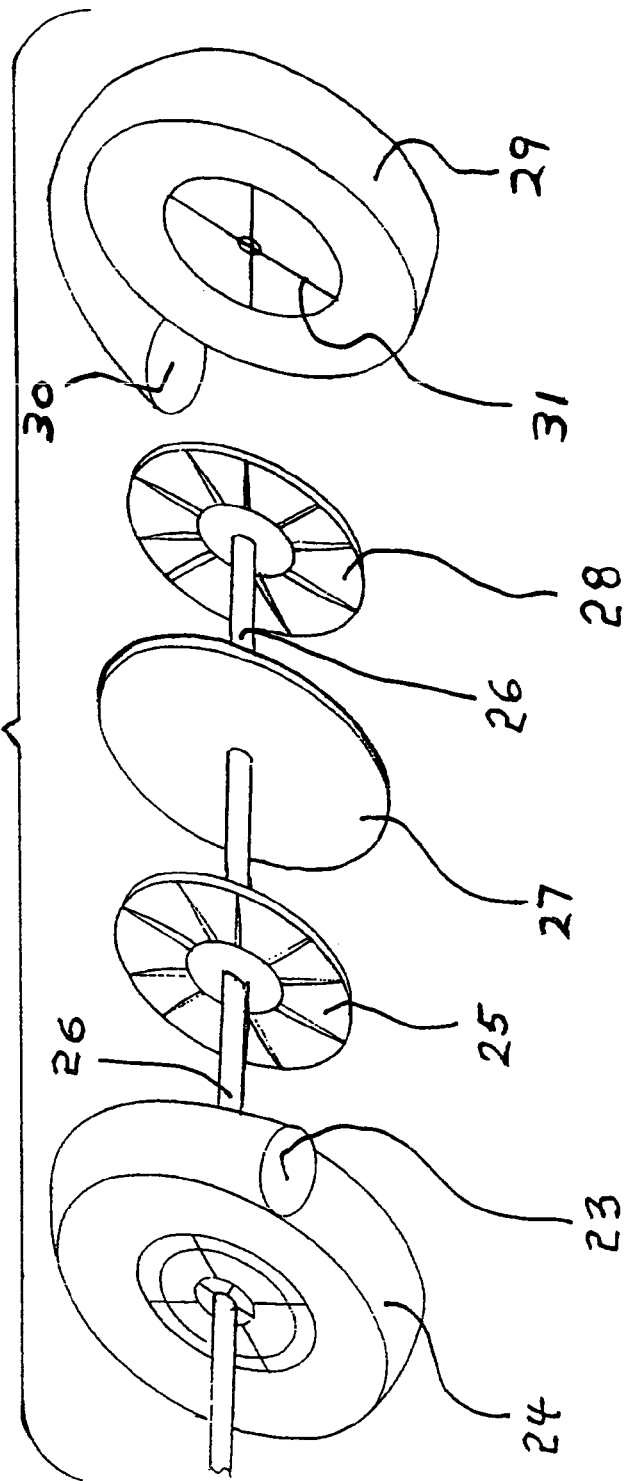
FIG. 5: an exploded view of the inner component parts of the multi-blower housing with stacked chambers and impeller/fan blade assembly of FIG. 1,2,3 or 4 above.

FIG. 5 is component inner parts exploded. The traditional blower operates with one blower housing and one discharge port. The multi-blower with multi discharge ports incorporates both left and right blower systems; a right blower discharge port 23, right blower housing 24, right impeller plate 25, impeller drive shaft 26, divider plate 27, left impeller plate 28, left blower housing 29, left discharge port 30 and air intake 31.

Figure 5A:
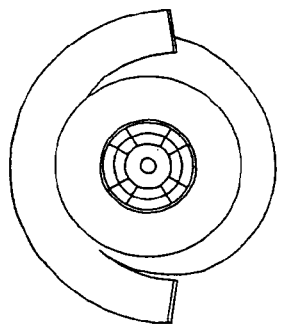
FIG. 5A: a frontal view of FIG. 5: without back support frame in the assembled mode.

FIG. 5A illustrates the air intake front view of the assembled multi-blower housing of FIG. 5. Without other listed external components.

The manner of usage and operation of the present invention is clear from the above description. Accordingly, no further discussion relating to the manner of usage and operation will be necessary. A provisional patent application No. 60/499, 481 was filed Sep. 2, 2003, which gave a brief visual and written description of the air blower with multiple-dual air discharge ports. With respect to the above description then the optimum dimensional relationships for the parts of the invention, to include concept, variations in size, materials, shape, form, function and manner of operation, assembly and use, are readily apparent. All equivalent relationships to those illustrated in the drawings and described in the specification are proposed to be included in the present invention.

Therefore, this is to be illustrative in part only as to the concept and principles of the invention. Further, since numerous embodiments, modifications and changes will readily occur to those skilled in the art, this is not in any way to limit the invention of the multi-blower to the exact construction and operation shown and described. Accordingly, all suitable modifications and equivalents may be resorted to, falling within the spirit, scope and unique concept of the invention, known and described herein as multi-blower.

I claim:

1. A backpack blower housing system, comprising:
   a backpack including shoulder straps and a carry handle;
   a housing including a left blower assembly, and a right blower assembly, each assembly defining a discharge port and being supported by the backpack; and at least one impeller inside said housing in fluid communication with component parts internal and external to the housing to operate both the left and the right blower assembly simultaneously.

2. A backpack blower housing system as described in claim 1 wherein the system further comprises a blower chamber defined by the left blower assembly and a blower chamber defined by the right blower assembly, wherein said blower chambers retain their own separate said impeller and discharge port where air is discharged simultaneously.

3. A backpack blower housing system as described in claim 2 wherein the at least one impeller comprises multiple impellers inside said blower chambers of said housing separated by a divider plate that is rotated by the engine driven shaft.

4. A backpack blower housing system as described in claim 1 wherein the system further comprises a left and a right flexible discharge tube in fluid communication with said discharge ports of said housing.

5. A backpack blower housing system as described in claim 4 wherein the system further comprises having two handle grips, one attached to said left flexible discharge tube and one attached to said right flexible discharge tube, allowing said operator a means to blow in separate directions at same time.

6. A backpack blower housing system as described in claim 5 wherein the system further comprises multiple on/off switches wired together, one on said left handle grip and one on said right handle grip coupled to said flexible discharge tubes in fluid communication with a single power source.

7. A backpack blower housing system as described in claim 5 wherein the system further comprises having two throttle controls in communication with a single carburetor and each of the two throttle controls is coupled to said handle grip of said left and said right discharge tubes.

8. A backpack blower housing system as described in claim 7 wherein the system further comprises a separate hollow casing to protect and house the throttle controls and said on/off switch, which are coupled to the flexible discharge tube.

9. A multiple air outlet backpack blower system for allowing a user to direct air in more than one direction at a given time, comprising, in combination:
a backpack;
a blower mounted on the backpack having a motor and at least two motor driven air impellers;
at least two blower tubes, the blower tubes being coupled to air outlet ports defined by the housing of the backpack blower; and
two handle grips, each of the handle grips coupled to each of the at least two blower tubes, allowing the user to direct each of the at least two blower tubes in differing directions at the same time.

10. A multiple air outlet backpack blower system as described in claim 9 further comprising at least one divider plate, the divider plate forming separate chambers within the housing, with each chamber having one of the two operatively associated motor driven impeller located therein.

11. A multiple air outlet backpack blower system as described in claim 9 wherein the system further provides a means to move debris from a surface through directing fluid onto a surface from the at least two blower tubes, each of the at least two blower tubes in fluid communication with the backpack blower worn on the back of an operator and manipulated by both hands of the operator simultaneously.

12. A backpack blower, wherein blower components, comprise:
a frame adapted to a user that supports a blower housing assembly and engine components;
an engine powering drive shaft coupled to at least one impeller that rotates blades mounted on the impeller;
a blower housing with internal multiple chambers, having more than one discharge port and being coupled to the engine powering drive shaft;
the at least one impeller being disposed within each of the internal multiple chambers, of said blower housing;
a handle grip on a left blower tube and a right blower tube, manipulating separate left and right blower tubes;
at least one on/off switch, one coupled to each of the left and the right blower tubes;
at least one throttle control regulates the amount of air generated; and
multiple hollow casings that house gas and power cables from said engine components, one coupled to said left blower tube and the other to said right blower tube.

* * * * *